(12) United States Patent
Spicer et al.

(10) Patent No.: US 8,838,592 B2
(45) Date of Patent: Sep. 16, 2014

(54) METHODS AND SYSTEMS FOR DEVELOPING A DATA REPOSITORY FOR HETEROGENEOUS MLS SYSTEMS

(75) Inventors: Peter F. Spicer, Menlo Park, CA (US); Frank P. Tadman, San Jose, CA (US)

(73) Assignee: MLSListings Inc., Sunnyvale, CA (US)

( * ) Notice: Subject to any disclaimer, the term of this patent is extended or adjusted under 35 U.S.C. 154(b) by 0 days.

(21) Appl. No.: 11/762,746

(22) Filed: Jun. 13, 2007

(65) Prior Publication Data
US 2008/0313225 A1   Dec. 18, 2008

(51) Int. Cl.
*G06F 17/30* (2006.01)
(52) U.S. Cl.
CPC ................... *G06F 17/30292* (2013.01)
USPC ............................. 707/736; 713/168
(58) Field of Classification Search
USPC ........ 707/1–10, 104.1, 736; 713/168; 705/36, 705/80
See application file for complete search history.

(56) References Cited

U.S. PATENT DOCUMENTS

| | | | |
|---|---|---|---|
| 6,519,618 B1 * | 2/2003 | Snyder ........................ | 707/104.1 |
| 6,636,803 B1 | 10/2003 | Hartz, Jr. et al. | |
| 6,883,002 B2 | 4/2005 | Faudman | |
| 6,985,902 B2 | 1/2006 | Wise et al. | |
| 7,346,519 B2 | 3/2008 | Carr et al. | |
| 7,571,166 B1 * | 8/2009 | Davies et al. ........................ | 1/1 |

(Continued)

FOREIGN PATENT DOCUMENTS

| WO | WO 96/36003 A1 | 11/1996 |
|---|---|---|
| WO | WO 01/04775 A2 | 1/2001 |

(Continued)

OTHER PUBLICATIONS

Doan, et al. Learning source descriptions for data integration. Available at http://www.cs.washington.edu/homes/pedrod/papers/webdb00.pdf. Accessed Oct. 22, 2008.

(Continued)

*Primary Examiner* — Hosain Alam
*Assistant Examiner* — Navneet K Ahluwalia
(74) *Attorney, Agent, or Firm* — Wilson Sonsini Goodrich & Rosati

(57) ABSTRACT

Systems and methods for developing a data repository containing property listing information automatically acquired from a plurality of multiple listing services (MLSs). The property listing information from various MLSs can be mapped to a common representation and stored in the data repository. The invention utilizes and transforms information from different source MLSs which may have a particular data schema that may or may not match a predetermined common schema for the data repository. The listing information is thus consolidated from MLSs even when their schema may be different from each another or the predetermined data repository schema. The data repository schema may be selected such that each of the fields that comprise the source MLS property listing information in its native schema (and all its elements including but not limited to, agent rosters, office rosters, and tax data) can be mapped from the source schema to the data repository schema (the destination). Accordingly, the data of the source property listing from various MLSs can be preserved. Possible mappings include one-to-one, one-to-many, many-to-one and others. For certain applications of the invention, mappings may be direct where the listing information data from an MLS is simply copied as is, or it can undergo a data transformation process that is based on a predetermined set of listing field mapping rules.

24 Claims, 10 Drawing Sheets

Mapping of Native Listing Schema

(56) References Cited

U.S. PATENT DOCUMENTS

| | | | |
|---|---|---|---|
| 8,032,552 B2* | 10/2011 | Davies et al. | 707/770 |
| 2002/0091923 A1* | 7/2002 | Chipman et al. | 713/168 |
| 2002/0169788 A1* | 11/2002 | Lee et al. | 707/104.1 |
| 2003/0055747 A1 | 3/2003 | Carr et al. | |
| 2003/0130924 A1 | 7/2003 | Muldrow et al. | |
| 2005/0149574 A1 | 7/2005 | Faudman | |
| 2005/0288920 A1* | 12/2005 | Green et al. | 704/3 |
| 2005/0289168 A1* | 12/2005 | Green et al. | 707/101 |
| 2006/0080114 A1 | 4/2006 | Bakes et al. | |
| 2006/0161449 A1 | 7/2006 | McKinney | |
| 2006/0190285 A1 | 8/2006 | Harris et al. | |
| 2006/0242160 A1* | 10/2006 | Kanchwalla et al. | 707/100 |
| 2007/0005448 A1 | 1/2007 | Benco et al. | |
| 2008/0172393 A1* | 7/2008 | Baird | 707/10 |
| 2008/0183598 A1 | 7/2008 | Carr et al. | |
| 2009/0307599 A1* | 12/2009 | Davies et al. | 715/738 |

FOREIGN PATENT DOCUMENTS

| | | |
|---|---|---|
| WO | WO 01/04775 A3 | 1/2003 |
| WO | WO 03/012581 A2 | 2/2003 |
| WO | WO 03/012581 A3 | 5/2003 |

OTHER PUBLICATIONS

Innovative Solutions. California Association of Realtors Business Plans for California Statewide Data Aggregation Service and California Statewide Multiple Listing Service. Available at http://www.car.org/media/pdf/106484/. Accessed Oct. 22, 2008.

Rahm, et al. A survey of approaches to automatic schema matching. The VLDP Journal. Springer Berlin / Heidelberg. 2001; 10(4):334-350.

Ziegler, et al. Three decades of data integration all problems solved? Available at http://www.ifi.unizh.ch/stff/pziegler/papers/ZieglerWCC2004.pdf. Accessed Jan. 22, 2007.

European search report dated Nov. 5, 2008 for Application No. 7254429.9.

RETS workgroup meeting minutes dated Apr. 18-20, 2007.

* cited by examiner

FIG. 1 - Search of common fields that exist across a multiplicity of MLS databases
PRIOR ART
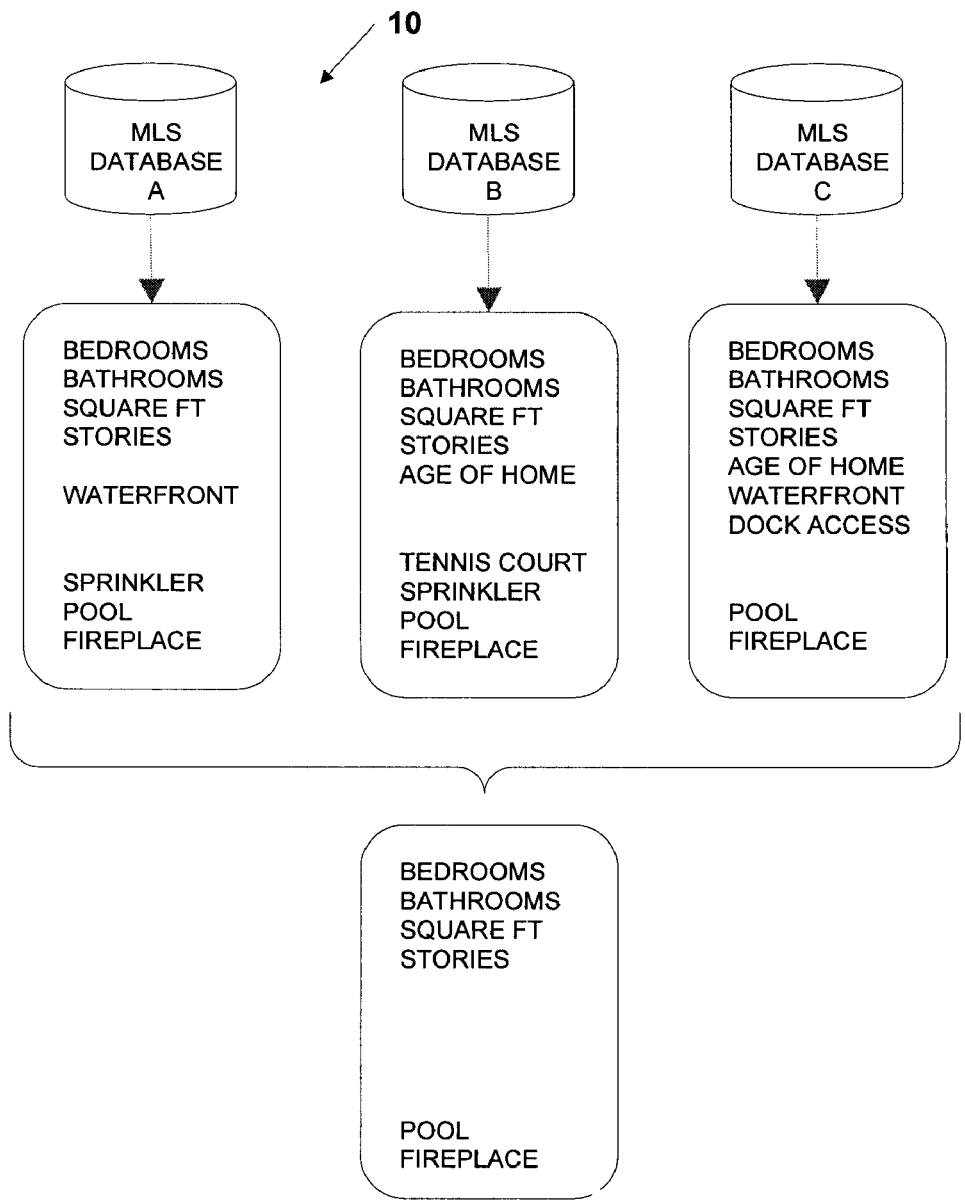

FIG. 2 - Search of fields within a detailed database after selection of common fields
PRIOR ART
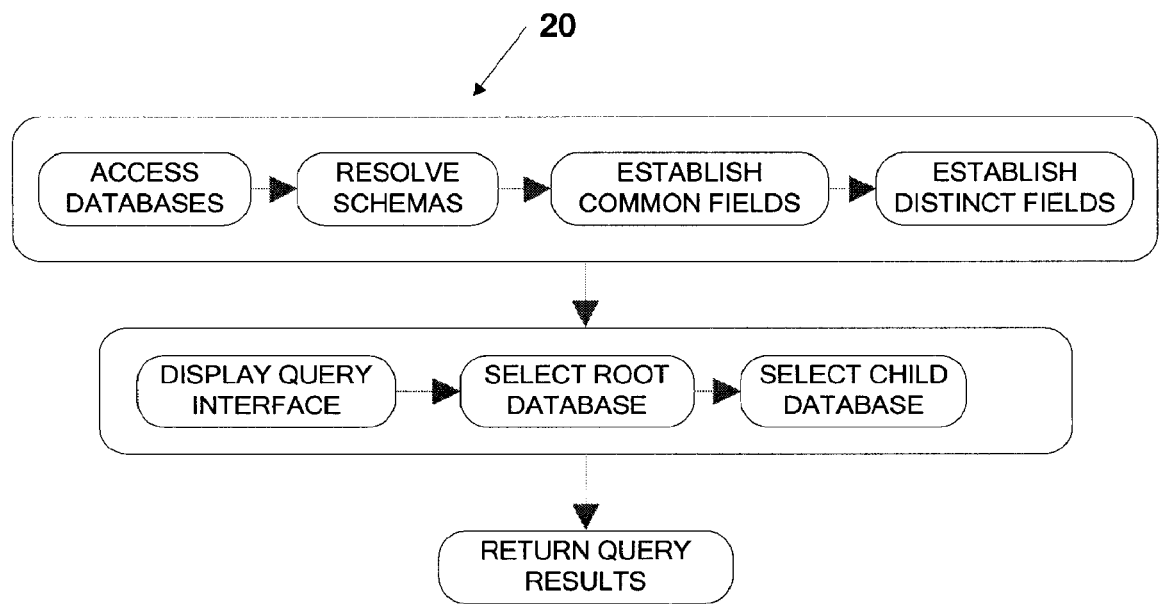

FIG. 3 - Common Schema Creation
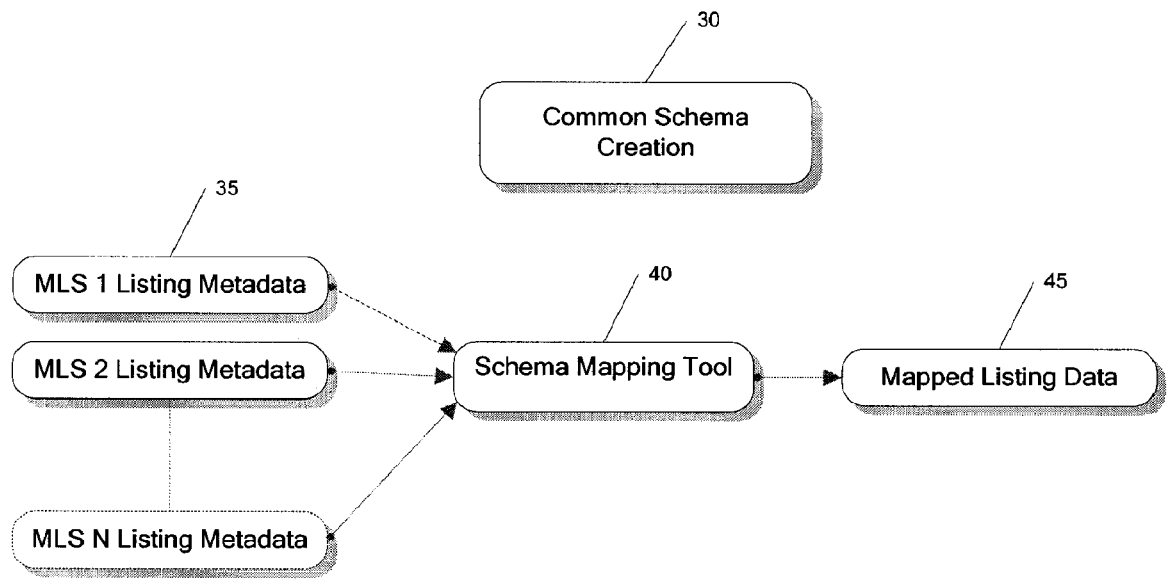
FIG. 3A – Common Schema Creation and Mapping Tool FIG. 3B – Common Schema – Property Resource Mapping
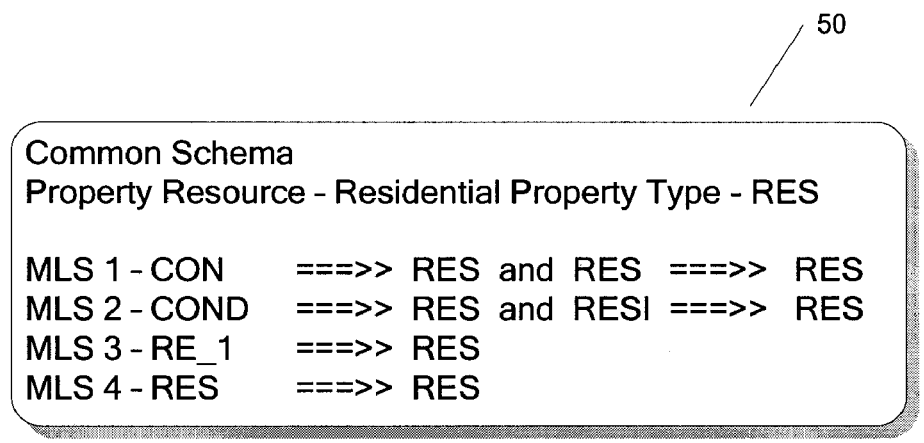
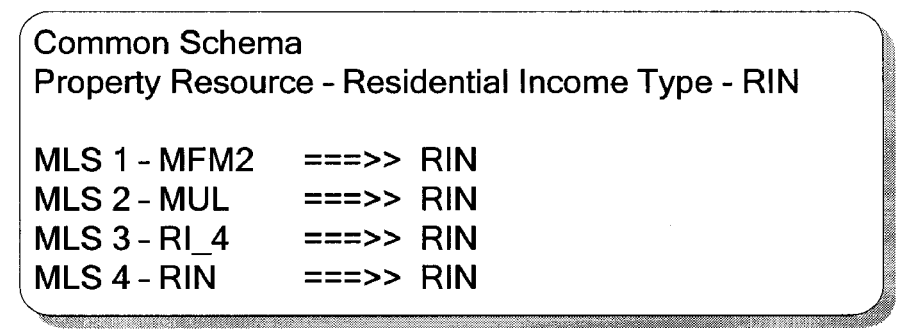

FIG. 4 - Overall processing pipeline for the current invention.
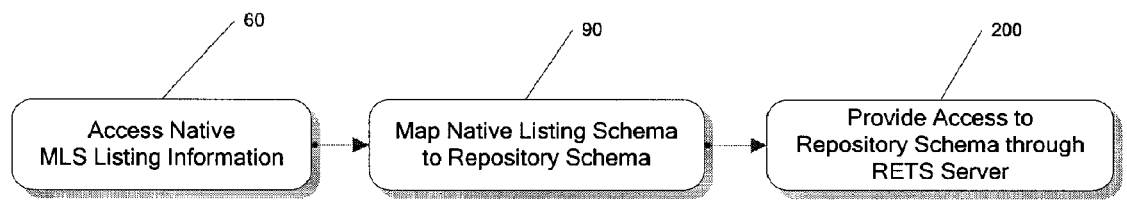
FIG. 5 - Detail of Accessing MLS Listing data
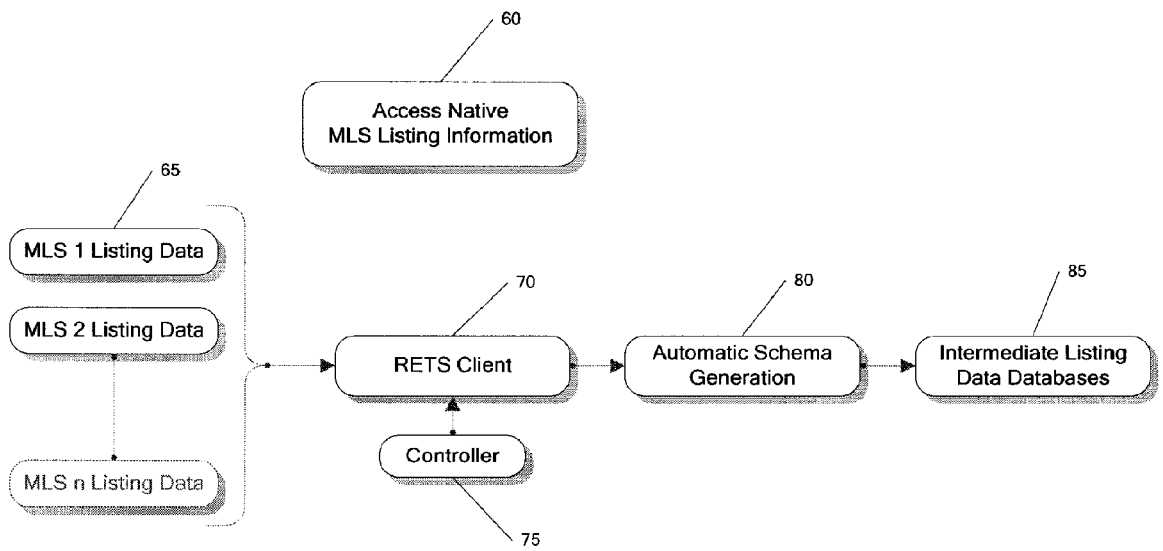

FIG. 6 - Mapping of Native Listing Schema
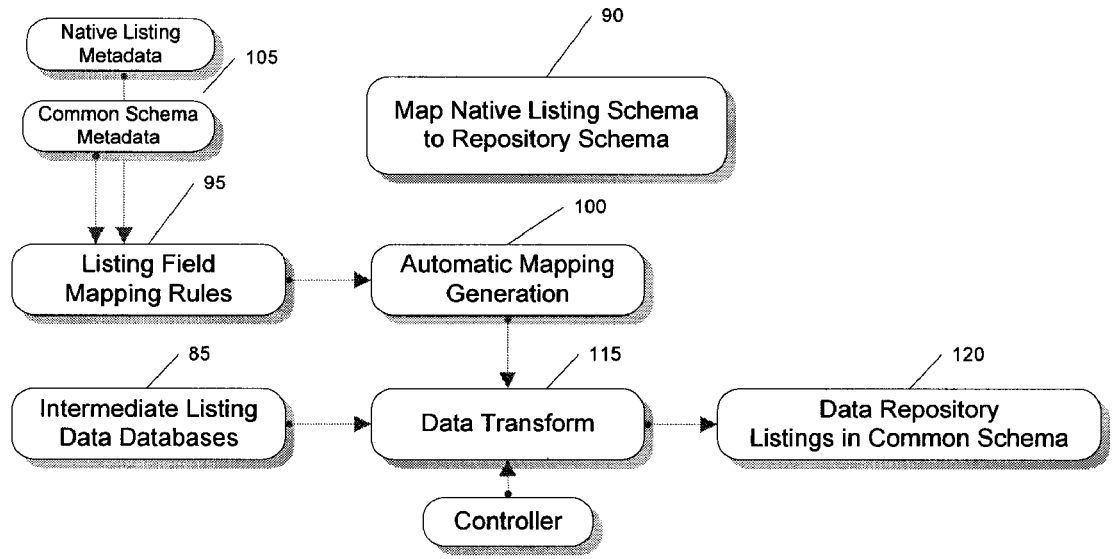
FIG. 7 - Detail of Mapping Process
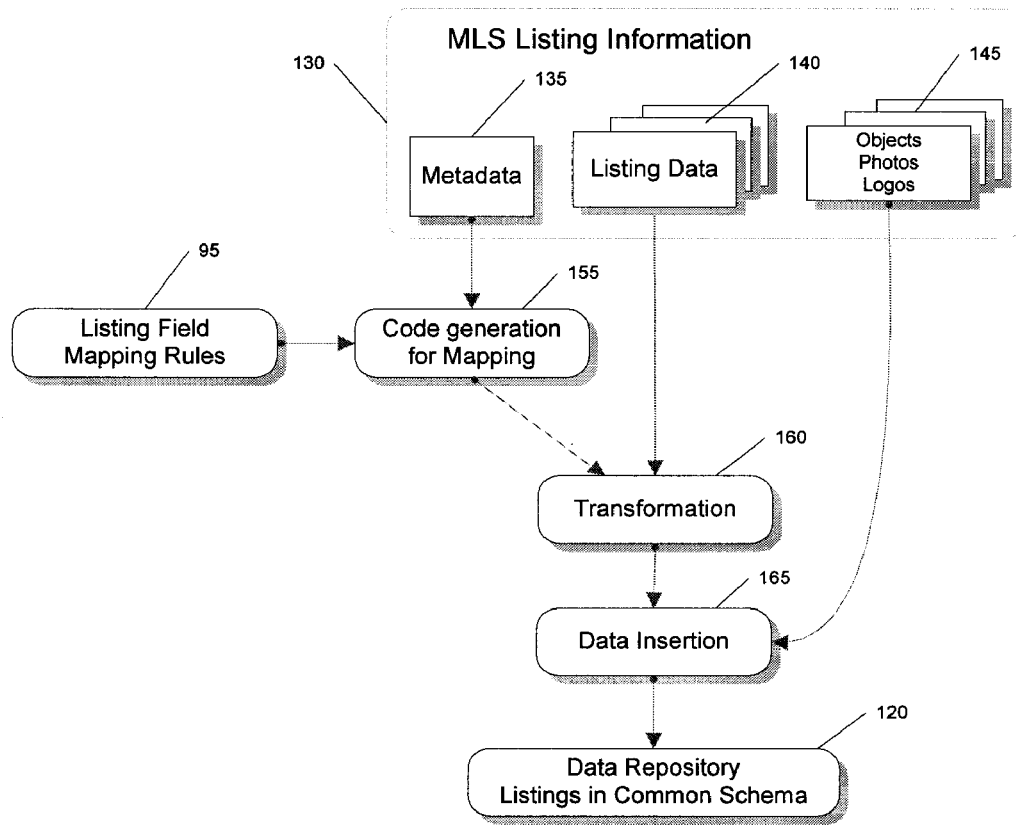

FIG. 8 - Storage and Distribution of Combined listing information
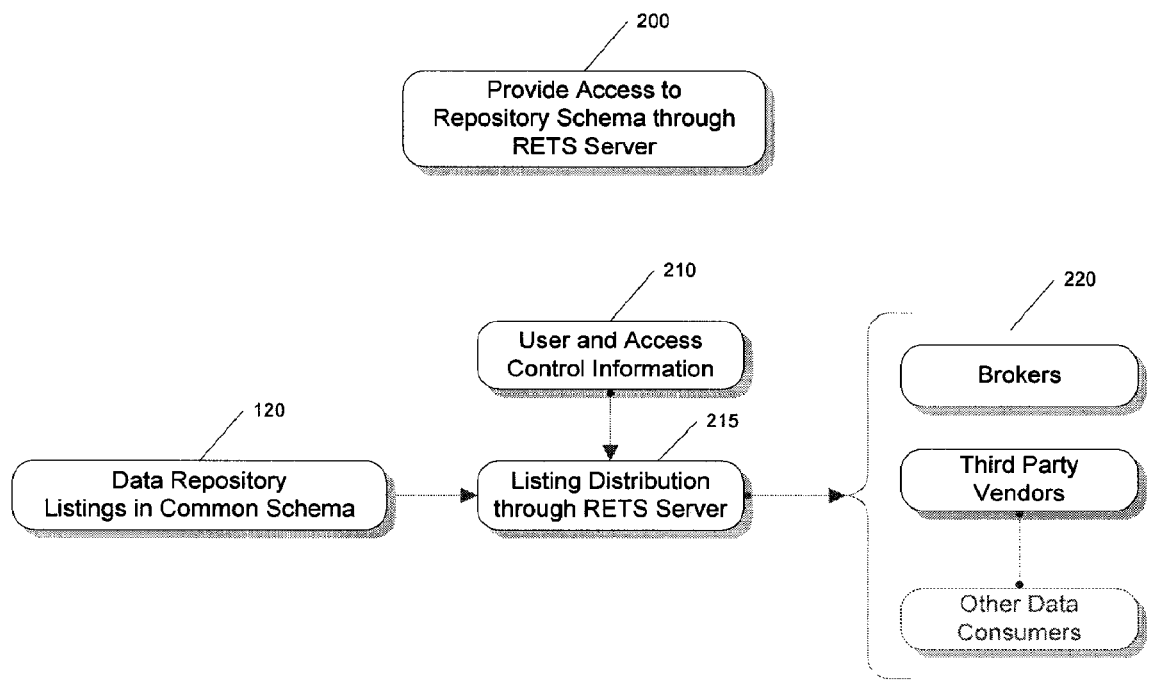

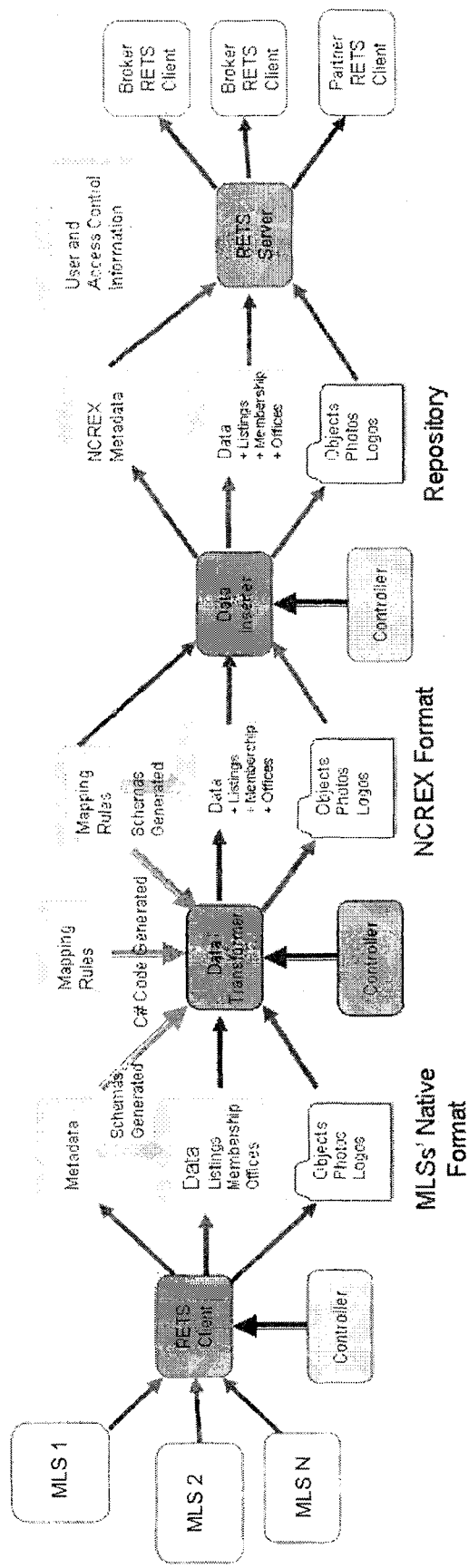
FIG. 9 - Overview

METHODS AND SYSTEMS FOR DEVELOPING A DATA REPOSITORY FOR HETEROGENEOUS MLS SYSTEMS

FIELD OF INVENTION

The invention relates to the acquisition and processing of property listings and other related information from a variety of multiple listing services. More particularly, the invention relates to creating and mapping information from multiple listing services to a common representative schema for dissemination to third parties that includes selected fields for a more complete data mapping relative to different systems.

BACKGROUND OF INVENTION

Over many years there has been the development of many multiple listing services (MLSs) that provide property listing aggregations for participating real estate brokers, real estate agents, and other participants in the real estate transaction chain. Historically, these entities have been very regional in nature, so that the details of property listing information although somewhat common have diverged widely in their specification. The basic fields, such as lot size, list price, size of building, number of bedrooms, etc., are present in all MLSs but even the representation and format of these common fields varies. Beyond the basic nature of the data collected by MLSs, their formatting varies widely.

In this equivalent period of time, real estate brokers and other entities that rely on receiving information from the MLSs have become less local and more regional. The business models have changed due in part to the wave of mergers and acquisitions that form much larger entities from what were historically localized real estate offices. These real estate brokers today are often faced with many different MLSs and their corresponding data formats, which lead to inefficiencies in the processing of property listing information. This has caused a certain degree of frustration in the industry as to MLSs that occupy neighboring regions because they may have quite different data structures to represent the property listing information.

FIG. 1 shows a prior art system 10 and method for searching among a plurality of MLS databases (MLS Databases A, B and C). This solution may be adequate for searching a plurality of MLSs that contain predominately the same information. But it is wholly inadequate for the more likely scenario where largely different MLS listing databases need to be searched. For example, it has been shown that as few as even the coordination of three separate MLS databases significantly reduces the numbers of common fields to unacceptable levels. This means that search making these databases in any practical sense to retrieve property listing information is not feasible. This is primarily due to the very small overlap that is likely in field definitions between the MLSs. As shown in FIG. 1, there may be only a relatively small subgroup of fields (bedrooms, bathrooms, square feet, stories, pool and fireplace) that are shared between MLS Database A, B and C. The information related to non-common fields among the databases are not utilized and cannot be universally searched.

One attempt to address this issue has been the development of an XML standard for the transfer or exchange of property listing information. This XML standard, which may be referred to as Real Estate Transaction Specification (RETS), has been developed by industry members over the last decade. Although the RETS standard has gone a long way to allowing electronic interchange of listing information at the protocol level as well as defining common basic fields (the Standard Names of the specification), it has not been complete enough to fully address issues concerning the interchange of data. For example, the standard does not cover the commercial classes of real properties at all. Some of the reasons for this lack of functionality has been organizational as well as the challenges and complexities in trying to find or adopt a common standard that takes into account all the various local fields necessary to support various MLSs. RETS provides a specification from which a mechanism can be implemented so that information from an originating MLS may be processed in an automatic fashion, but the standard remains inadequate in fully addressing the exchange of the various kinds of information among different MLSs.

FIG. 2 also shows a known system 20 that attempts to improve the situation as described above by performing a first level combined field search that is followed by a detailed search in a child (native) database. A more detailed description of the system is described in U.S. Pat. No. 6,519,618 (Snyder) which is incorporated by reference herein in its entirety. A plurality of databases may be accessed initially and the various schemas employed can be resolved in order to establish common fields among the databases. Moreover, distinct fields from each database are established too. When a user interface is displayed and presented, a user selects both a root database and a child database. The results from the particular query are returned to the user that includes information derived from the root database and the child database. This system still remains deficient from a search perspective as the logic necessary to retrieve listing information relies on the search mechanism understanding the different semantics as they apply across a multiplicity of MLSs. This is due to the fact that the field names, data types, and semantics may very from MLS to MLS even though the initial search was against common fields.

Accordingly, there is a need for a solution that provides a comprehensive source of information conforming to a common schema across multiple MLSs.

INCORPORATION BY REFERENCE

All publications and patent applications mentioned in this specification are herein incorporated by reference to the same extent as if each individual publication or patent application was specifically and individually indicated to be incorporated by reference.

SUMMARY OF THE INVENTION

The invention provides systems and methods for implementing operational procedures for obtaining and processing property listing information from multiple MLSs. A common schema can be created for information received from different MLS resources. In particular, the information from different MLS databases can be mapped to the common schema. The mapped listing data according to the common schema can be loaded into a data repository for later distribution. The information within the data repository can operate as a real estate exchange derived from heterogeneous MLS systems. Various aspects of the invention can be appreciated individually or in combination with each other as set forth below.

An aspect of the invention provides means for developing a common schema from individual or disparate MLS schemas. A preferable embodiment of the invention utilizes the native metadata from an originating MLS in creating a common unified schema.

Another preferable embodiment of the invention provides a complete schema that can map each individual field from a native MLS to a corresponding equivalent field in the combined schema. Information contained in a unique field from an originating MLS is therefore maintained rather than ignored or relegated to a separate native or another database. For example, multiple MLS database fields can also be combined. Where MLSs employ separate "Zip" and "Zip4" fields, a common schema provided herein may thus combine the information from these two separate fields into one single field, namely a "Zip+4" field. This aspect of the invention provides numerous advantages including an ability to conduct MLS searching using a greater number of fields or parameters rather than just how many fields are shared or common among selected MLS databases. These additional fields can be used in any search operation unlike the systems available today. In addition, there is no need to retrieve data from a separate native database as required by some systems today since the mapping operation in accordance with the invention can effectively preserve original field data within a single consolidated data repository.

With respect to another aspect of the invention, a variety of mapping methodologies are provided as part of an overall processing pipeline of MLS database information. In order to effect mapping of information from heterogeneous MLS systems to a common schema, the definition(s) of the combined schema can be initially determined. A process can be therefore adopted by which a combined schema field is developed from the semantics of one or more equivalent native MLS database fields. So long as the semantics of the field are preserved in accordance with a preferable embodiment of the invention, such mappings involving changes in data type can be effectively executed. Thus semantically equivalent fields from different databases can be equivalently mapped despite there being different data types among various MLS systems.

For certain applications of the invention, the mapping of data to the common schema is not purely a mechanical or simplistic step. For example, mapping for data in certain fields may sometimes involve replacing text or preferably English entries in a list of choices with a synonymous phrase in order to unify terminology and description. The mapping for some fields may require additional terminology, data translation and designer alterations in order to provide a common schema for selected native databases. Once the process of defining the common schema is completed, and the mappings from native MLSs to the combined schema are complete, all fields from the selected native MLSs can be mapped using the common schema to create a single data repository. This represents a significant improvement over known systems that require searching and selection of multiple databases (root/child databases) as described in U.S. Pat. No. 6,519,618 (Snyder) which is incorporated by reference herein in its entirety.

Another aspect of the invention provides software tools that allow collaborative development of combined schemas by participants from various native MLSs. These tools can allow for the creation, the maintenance, and the reporting components that facilitate or make practical the construction of a complex schema from a multiplicity of MLSs. Without such tools provided in accordance with this aspect of the invention, the sheer volume of information from the MLSs can make it extremely difficult or impracticable to create a truly unified combined schema. Accordingly, the common schema mapping tools provided herein take into account participant input to facilitate the creation of consolidated MLS data repositories.

Furthermore, another aspect of the invention provides automatic code generation which utilizes a native MLS schema, as well as the combined or common schema, to generate the mapping of information from the native format. Accordingly, an algorithmic code that performs the mappings to the combined format can be automatically generated when a native MLS schema changes, when the combined schema changes, and/or when the mapping requirements change.

The invention further includes operational procedures and systems that provide a real-time updates to property listing information in a common repository. A preferable embodiment of the invention provides automated processes whereby updates to a native MLS listing databases can be automatically acquired by a client component. Accordingly, information related to new listings from a native format can be therefore transformed into the combined schema format to include updated information in substantially real-time.

In addition, the invention herein provides methods of developing a combined schema that has sufficient semantics to support the representation of property listing fields from multiple MLSs. A data mapping process can be developed that allows each field of each MLS to be mapped to the combined schema according to a preferable embodiment of the invention. The processes and procedures described herein for retrieving property listing information from a plurality of MLSs enable property listing fields from each origin MLS to be mapped to the combined schema. Additionally, tools are provided herein to maintain and extend the common property listing data schema.

Other goals and advantages of the invention will be further appreciated and understood when considered in conjunction with the following description and any accompanying drawings. While the following description may contain specific details describing particular embodiments of the invention, this should not be construed as limitations to the scope of the invention but rather as an exemplification of preferable embodiments. For each aspect of the invention, many variations are possible as known to those of ordinary skill in the art. A variety of changes and modifications can be made within the scope of the invention without departing from the spirit thereof.

BRIEF DESCRIPTION OF THE DRAWINGS

FIG. 1 is a block diagram of a prior art system that processes MLS database information from different schemas utilizing common fields.

FIG. 2 is a block diagram of another prior art system that allows drill down searching of certain fields within a child database after performing a search in a root database having information from common fields.

FIG. 3 is a block diagram showing the creation of a common schema in accordance with an aspect of the invention.

FIG. 3A shows a screen shot from a user interface for creating a common schema that includes a mapping tool provided in accordance with other embodiments of the invention.

FIG. 3B describes property resource mapping of information to a common schema in relation to exemplary fields such as residential property types and residential income types.

FIG. 4 is a block diagram of an overall processing pipeline provided in accordance with the invention which includes the retrieval of property listing information from multiple MLSs, the mapping of that listing information to a common data repository schema, and the distribution of these listings from the common repository.

FIG. 5 describes a process of accessing property listing information from an MLS using an intermediate client.

FIG. 6 and FIG. 7 are block diagrams describing steps involved in mapping native listing information to a common schema, resulting in a unified property listing database or a data repository.

FIG. 8 is a block diagram showing how common listing information can be utilized and accessed through a RETS server by users or third parties.

FIGS. 9-13 describe a real estate exchange that includes a data repository aggregating listings from multiple MLSs.

DETAILED DESCRIPTION OF THE INVENTION

Figure 10:
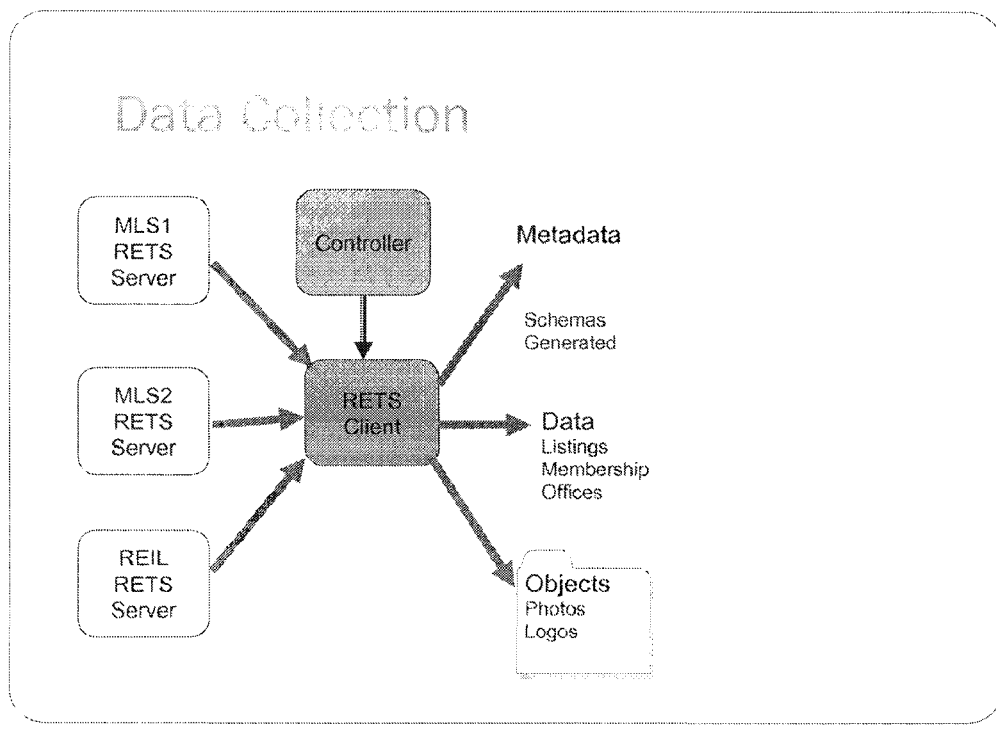

FIG. 3 illustrates the creation of common schemas provided in accordance with the invention. The creation of a common schema 30 may involve the mapping of individual property listing field information. The individual property listing information can be extracted from multiple MLS databases (MLS 1 to N). In accordance with a preferable embodiment of the invention, all elements that make up the information of each listing are also included such as the metadata of the listing 35 (MLS 1 Listing Metadata to MLS N Listing Metadata). In particular this may include the metadata representing a relevant class (the property type) of the listing, as well as any other descriptive information related to the property. Furthermore, a schema mapping tool 40 provided in accordance with another aspect of the invention can map the native listings and related metadata from the various MLS databases to a predetermined common schema. The consolidated information from multiple MLS databases is thus available as mapped listing data 45 within a single repository according to the common schema.

FIG. 3A provides a screen shot for an implementation of a tool that can perform the mapping operations of information from a native listing schema to the common schema. The mapping tools provided herein can be designed to hold multiple sets of metadata. A selected number of field types from the MLS databases can be user selected and checked as "active" for the common schema within a user interface. A variety of fields for the common schema can be selected from including but limited to fields for: an agent, a city, a county, history, an office, an OpenHouse, a property, a school, a school district, and a state. Moreover, the listing field information can be recognized at one more levels such as a ResourceID, VisibleName and a Standard Name.

A preferable embodiment of the invention provides automated mapping of native listing information due to the size and complexity of some of the mapping operations described herein. This may also provide an ability to facilitate collaborative efforts between participating parties within a real estate exchange who will utilize the data repository. Other embodiments provide mapping tools that facilitate the creation of a common schema as well as its maintenance and extension.

FIG. 3B illustrates an embodiment of the invention that describes the mapping of property resource information to a common schema. In this embodiment, the mapping of information may actually occur at four (4) different levels: resources, classes, fields, and values.

At the resources level, the relationship of each MLS's resources to the target resources is described. This can be done in a relatively straightforward manner. For example, each MLS's property resource can be mapped onto the target property resource; each MLS's agent resource can be mapped onto the target's agent resource and so on. Furthermore, each resource can be further characterized at a class level. For example, a property resource 50 may be characterized as different classes of properties such as a Residential Property or a Residential Income type of property. FIG. 3B shows how these classes can be mapped from one or more native listing schema (MLS 1-4) to a common schema. It shall be noted that this mapping need not be 1-1 (1:1 correspondence)—several source classes can be combined into a single target class, or a source class can be split into multiple target classes based on the content of each of its records. It shall be further noted that each MLS may use a different name for the same type of resource. This illustrative embodiment represents a correspondence between each MLS's names and the names in the common schema.

Each class can be further characterized at a fields level. For example, the fields of each pair of classes can be mapped at a next level. The field mapping describes how source values are transferred to target fields. In many cases, the value is simply copied from the source to the target, but this embodiment also allows the mapping to be annotated with a function which is applied to the source value to produce the target value.

The most detailed level of mapping, values, is used for only some fields in certain embodiments of the invention. Following the RETS data model, fields can contain either a single value from a list of choices (single-valued Lookup) or multiple values from a list of choices (multi-valued Lookup). The value mapping describes how each possible value of a source field is transferred to a destination field. Typically, this is used to map a choice onto an identical or synonymous choice in the target. This ability allows the target model to have a standardized terminology, since choices identical in meaning from different MLSs is often expressed using different terminology. For multi-valued lookups, each value can be mapped onto a different target field. This allows the organization of the data to be refactored since different source MLSs often times organize their data differently.

All listing information data from various MLSs can be thus mapped. Accordingly, data fields from different databases can be equivalently mapped despite there being different data types, different organizations, and different terminology among various MLS systems.

FIG. 4 generally describes a method provided in accordance with another aspect of the invention that transforms native MLS listing information to a repository schema that can be accessed and distributed throughout a real estate exchange system. The native MLS listing information from similar or heterogeneous MLS databases can be accessed 60 and processed in accordance with the invention. The listing information and data (metadata) can be mapped 90 from a native listing schema to a predetermined repository schema that may be collaboratively agreed upon or selected in advance. The data modified in accordance with the common schema can be therefore stored in databases or computer servers such as RETS servers which can be accessed 200 by realtors, agents and other users within a real estate exchange system.

FIGS. 5-8 describes in further detail the overall process set forth in FIG. 4.

As shown in FIG. 5, the listing data or native MLS listing information can be accessed 60 and collected from a variety of sources such as RETS servers for selected MLSs 65 (MLS 1 to MLS n). A controller 75 can be selected to instruct a computer such as RETS client 70 to access the listing data from the MLSs. This information access from the various MLS databases or servers can be performed on command or at periodic intervals determined ahead of time. The information can then be next processed automatically 80 according to the predetermined schema but held in the interim within an intermediate listing database 85 in its native MLS format (e.g., cached in computer memory) according to an alternative embodiment of the invention.

FIG. 6 illustrates a preferable embodiment of the invention that provides mapping of data in native listing schema to a repository schema. A set of predetermined field mapping rules 95 for the repository schema can be created based on a variety of parameters including particular schema metadata. The available native listing metadata from the various MLSs can be considered in view of common schema metadata 105 to dictate the mapping rules for automated mapping. As a result, the data from intermediate listing data bases 85 as described above can be transformed 115 in accordance with the automated mapping generated 100. Accordingly, this feature of the invention may utilize a set of listing field mapping rules derived from the native listing metadata and the common schema metadata to generate code that uses the native intermediate listing data database to perform an automated mapping from the native listing field information to the common schema 120.

A further description of the mapping processes herein for native MLS listing information is provided in FIG. 7. The MLS listing information 130 from the various sources may include numerous components such as corresponding metadata 135, listing data 140 and objects/photos/logos 145 for the particular listing(s). According to selected field mapping rules 95, the native metadata from a particular MLS listing can be utilized in part to generate code 155 to perform automated mapping to the common schema. The native MLS listing data can thus undergo a data transformation 160 that results in data formatted according to the common schema. Other information from the MLS listing information such as objects/photos/logos can be thereafter included in a data insertion step 165 resulting in data repository listings modified in accordance with the common schema 120.

Below are some examples of typical mapping operations that can be performed on individual data fields from various MLS listings as part of the data transformation processes described herein:

Unchanged. The source field is copied unchanged to the destination. In all cases, the source and destination fields may not have the same name.

Size change. The source and destination fields may be similar types with different sizes. For example, the source is a short integer and the destination is an integer, or the source is a string and the destination is a longer string. If the destination is smaller or shorter, then the mapping must describe what to do with source values that are too large.

Concatenated strings. The destination is a concatenation of multiple source strings. For example, an MLS may have a separate field for each line of the property remarks, which must be concatenated to get the full remarks.

Reformatted strings. Some structured data, like phone numbers may be specified to be in a particular form in selected MLS while another MLS may use a different form or be free form. For example, suppose a common schema uses "(nnn) nnn-nnnn" as the format, but an MLS uses "nnn-nnn-nnnn."

Type change. A common case is where a source an MLS uses a string to represent a numeric or date value while another uses a numeric or date type. Another is where an MLS uses a two-valued lookup with values like "yes" and "no" or "included" and "not included" where the common schema uses a Boolean type field.

Remapped integers or strings. Suppose the MLSs have a value which must be distinct from other MLSs values, but the source values collide. The values must be remapped so as to be distinct. Examples are the MLS number identifying a property (listing) and marketing area numbers. For example, a selected MLS using 15 may turn into 2015 or 2-15 where 2 represents the selected MLS and 15 is a marketing area designation.

Numeric ranges. A common usage in the source MLSs are numeric ranges (with or without units). These are ranges like 6+ bedrooms and 1 ac-2.5 ac. One possible implementation of a common schema has these represented as pairs fields of the appropriate type.

Multiple choice non-lookups to lookups. Decisions must be made on how multi-valued lookups are to be handled. The common schema for example may use single-valued lookups for all multiple choice items with a fixed domain. Some MLSs may use strings, e.g., city name, numbers, or letter codes, e.g., lot size source is C for county, A for agent, and O for owner.

Refactored lookups. The groupings, especially of multi-valued lookups may be different. For example, one MLS may group all amenities under an amenities lookup where as the common schema may split out indoor amenities and outdoor amenities. Another MLS may group accessibility amenities (for handicapped people) under a single lookup where indoor or outdoor. It may also happen that a group of values is mapped to a more generic value in one place and to specific values in another. Most notable is the status field. The common "pending", "pending show", and "pending release clause" statuses may be mapped onto "pending", "active contingent", and "pending" statuses, respectively, but also onto a Boolean field called "release clause."

Redundant data. Some MLSs have redundant fields representing the same thing. Notable is the field for lot size where there is often both a range and a numeric value.

Fixed-point values (scaled integers). Some MLSs have fields that are fixed point values represented as scaled integers, e.g., an integer value of 1234 represents 12.34.

Computed and implied values. Some computed fields, notably DOM and CDOM may not be consistently computed across all MLSs or even supplied by a RETS server at all. An MLS may specify a computation which replaces the value supplied by a source MLS. Another example is the bathrooms range field which is factored into several fields in the fifth column following the RETS standard. For example, if an MLS's lookup value of 3½ bathrooms may be represented in the fifth column as 4 total baths (4 rooms that are bathrooms), 3 full baths, and 1 half bath, on the assumption that few homes have 2 full bathrooms and 3 half bathrooms or any other combination totaling 3½.

Omitted values. There will be many more common schema fields than any one MLS supplies implying that there may not in fact be an equivalent match from the common schema back to the native MLS.

FIG. 8 provides an illustration of how the combined listing information from various MLSs according to a common schema can be stored and distributed. Once the mapping process is complete as described elsewhere herein, access to the data repository 120 may be provided (including the mapping listing information) through a variety of industry standard interfaces including, but not limited to, RETS and XML 200. A preferable embodiment of the invention includes ways of controllably distributing information or allowing access to the repository. The repository may be modified to include access control based on user access privileges and control information 210. While some embodiments of the invention provide a centralized data repository server or system that can be accessed, the data repository information may be accessed alternatively through a server to third parties. For example, the listing information from the repository may be accessed through RETS servers 215 for different MLSs across local or wide area networks (Internet). A variety of different users may access the data repository servers or intermediate RETS servers and other network servers including brokers, third party vendors and other data consumers 220.

FIG. 9 is an overview of another implementation of the invention that provides a computer based real estate exchange. The real estate exchange may consist of four components: a data collection system, a data transformation system, a data insertion system, and a data distribution system. The system provides a data repository of listings from multiple MLSs according to a common schema which is accessible via a variety of computer networks including the Internet. A preferable embodiment of the invention allows an MLS to enter and maintain information in its native format while the same is also included in the data repository under a common schema. The members of the real estate exchange can define ahead of time: (i) a data model for a unified data repository utilizing metadata for a common schema and native listing metadata; and (ii) a set of transformation rules for data in the native RETS format for each MLS. The invention can be implemented together with existing computer systems which include RETS servers and clients used by various MLSs.

FIG. 10 describes a data collection system that collects listing information and data from member MLSs. Such information and data may reside in a plurality of RETS servers operated or maintained by groups of one or more MLSs. A controller and related software program may instruct a selected RETS client (computer) to poll a series of one or more RETS servers for data periodically. This polling may take place at selected time intervals such as 10-30 minute intervals. The controller/client can handle retries with the RETS servers and flow control as desired. The data entered and stored in the MLS servers remain in the native RETS format for the respective MLSs. Furthermore, the RETS client may direct listing information from various MLSs in its native schema, including three basic kinds of information: metadata (which can be used in generating a common schema), data related to particular MLS listings/Memberships/Offices, and objects/photos/logos. As with other embodiments of the invention herein, a number of databases or folders can be configured to store such information as illustrated in the figure.

Figure 11:
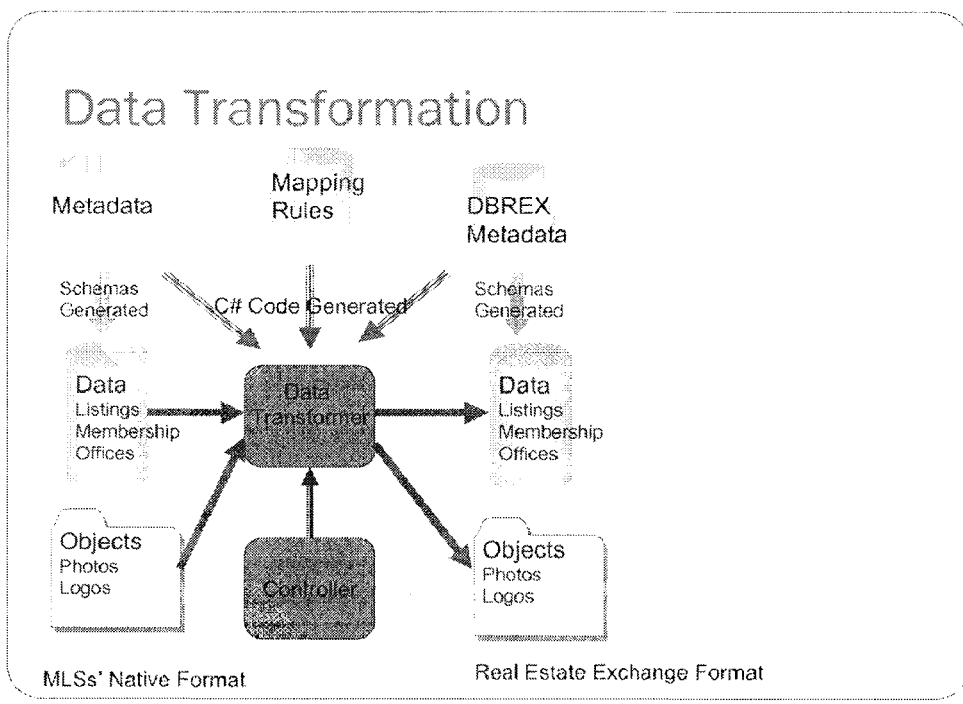

FIG. 11 describes a data transformation system which further processes the various listing information in the MLSs' native format gathered by the data collection system. This system or portion of the exchange includes a data transformer that performs a transformation of the data from MLSs' native formats to a predetermined or common format/schema. A controller may direct the data transformer to transform or convert listings to the predetermined format after they arrive. The predetermined format may be developed ahead of time by various MLSs that form or contribute to the real estate exchange. The metadata from both native MLS listing information and the predetermined format can be used to generate code to perform an automated mapping from native listing field information to a common schema as described in accordance with other embodiments of the invention herein. Accordingly, listing information from various MLSs are transformed into data in accordance with the predetermined format.

It shall be noted that objects/photos/logos may be also processed by the data transformer. At minimum, objects are preferably copied to a new store and associated with the transformed listings. For example, listings in the common format may have a single unique identifier. This identifier is different than the unique identifiers of the source MLSs because different MLSs may use the same kind of identifiers for their listings, e.g., a number. The data transformer can therefore assign a new unique identifier and associate the objects for each listing with its new identifier. A similar process may occur for other kinds of objects, e.g., agent photos. In addition, the transformer may alter the objects themselves in another embodiment. For example, each MLS may have different standard photo sizes and resolutions. The transformer may be responsible to adjust the photos to meet the standards of the common data.

Figure 12:
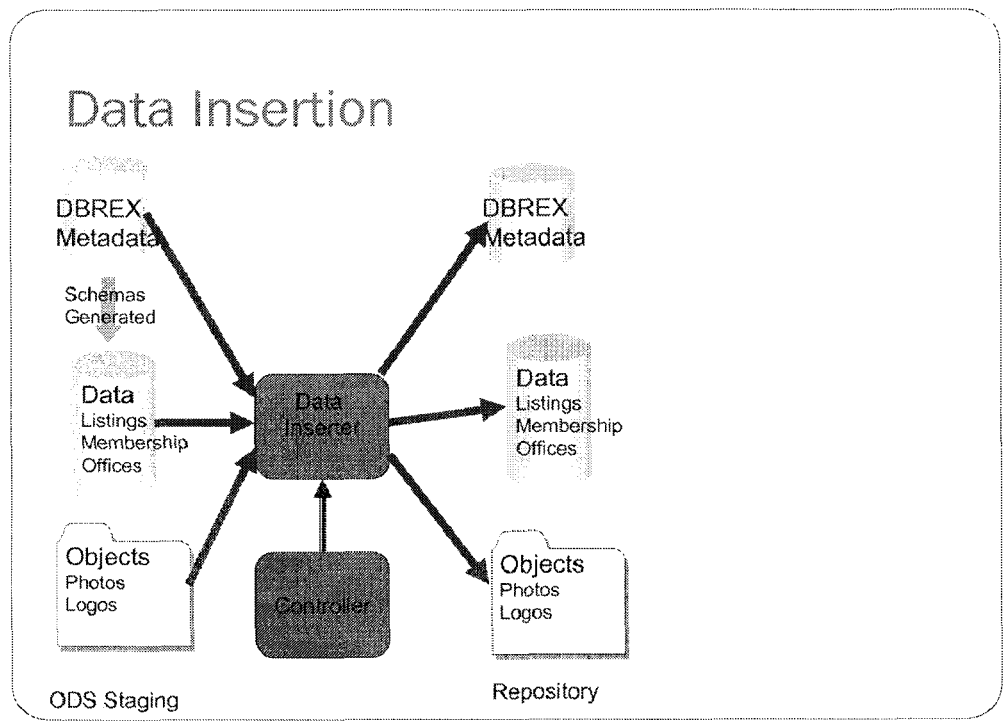

FIG. 12 describes a data insertion system that inserts selected listing information data to various parts of the system and exchange. A preferable embodiment of the invention includes an operational data store (ODS) that also contains consolidated listing information from multiple MLSs in the same format as a data repository. While the data in a ODS staging process for the system can be stored in the same format, its schema can be generated in a manner that provides for more rapid adaptability. Meanwhile the data repository schema may often require further optimization (hand optimized) for high performance access by users. The ODS staging process may thus serve as an interim step for preparing data for the data repository, or for storing time-sensitive operational data that can be accessed more quickly and efficiently. In contrast to the data repository, which may contain larger amounts of relatively static data, the ODS may include relatively smaller amounts of information that is updated throughout the course of a transaction or selected time intervals. The ODS data staging can therefore support quick and simple queries, whereas more complex and comprehensive queries can be performed with the data repository instead. The repository schema may therefore lag behind an ODS staging schema which partially isolates the data repository from certain changes. The ODS staging may be designed as part of the system following transformation of data from multiple MLS sources to facilitate such operations and other analysis.

Figure 13:
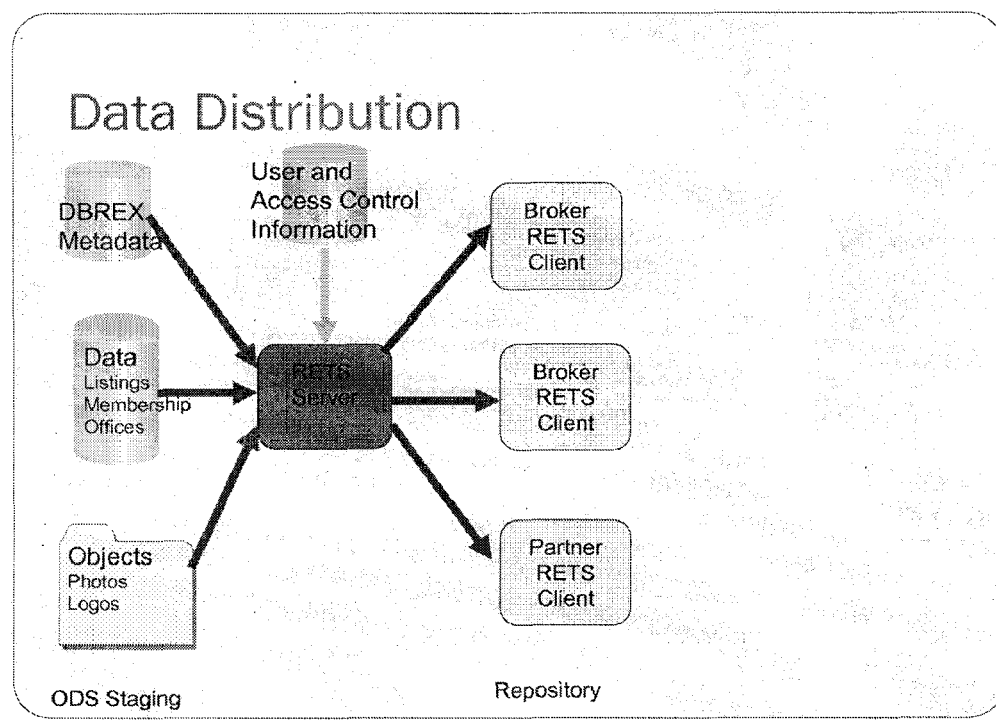

FIG. 13 is a data distribution system that delivers data repository listings in a common schema. A RETS server may receive such information in the predetermined format before distributing to various MLS clients the relevant metadata, data, and objects. The access to this data may be selectively controlled according to user and access control information stored in an access database. As with other databases referenced herein, the databases holding such information may reside in a series of one or more servers and other networked computers. The server may be a RETS standard (RETS 1.5, RETS 1.7) based server that controls access for various users.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of creating a consolidated data repository for a real estate exchange containing listing information from a plurality of MLS databases comprising the following steps:

collecting native MLS listing information from a selected number of databases stored in a memory in their native schema wherein at least two databases have different native schemas, and wherein each of the native MLS listing information includes a corresponding metadata;

mapping both the native MLS listing information for each and every native MLS listing field and metadata associated with the MLS listing information in their native schema to the consolidated data repository having one or more consolidated MLS listing fields of a consolidated data repository schema in accordance with a predetermined set of MLS listing field mapping rules for each and every native MLS listing field to at least one consolidated MLS listing field, wherein the native MLS listing information for each and every native MLS listing field is mapped to a corresponding equivalent field of the consolidated data repository schema including MLS information from different native schemas, wherein the consolidated data repository schema is determined ahead of time by a group of one or more MLSs that form or contribute to the real estate exchange;

transforming, with aid of a controller comprising a processor, both the native MLS listing information for each and every native MLS listing field and the metadata associated with the MLS listing information in their native schema to the one or more consolidated MLS listing fields of the consolidated data repository, wherein the native MLS listing information for each and every native MLS listing field is transformed to the corresponding equivalent field of the consolidated data repository schema including MLS information from different native schemas, and wherein said transformation occurs in accordance with a specific code generated based on at least one of the following: the metadata associated with the native MLS listing information and the consolidated data repository schema; and generating the consolidated data repository having the one or more consolidated MLS listing fields for access by different users of the plurality of MLS databases who would otherwise only have access to their native MLS listing information in their native schema.

2. The method as recited in claim 1 further comprising the step of:

inserting additional data to the MLS listing information after transforming the native MLS listing information.

3. The method as recited in claim 1 further comprising the step of:

distributing the listing information from the consolidated data repository to an end user.

4. The method as recited in claim 1, wherein the predetermined step of listing field mapping rules are based on native listing metadata derived from native MLS listing information.

5. The method as recited in claim 1, wherein the predetermined step of listing field mapping rules are based on native listing metadata derived from the consolidated data repository schema.

6. A non-transitory computer readable medium containing program instructions for creating a consolidated data repository for a real estate exchange containing listing information from a plurality of MLS databases, comprising the following:

collecting native MLS listing information from a selected number of databases stored in a memory in their native schema wherein at least two databases have different native schemas, and wherein each of the native MLS listing information includes a corresponding metadata;

mapping both the native MLS listing information for each and every native MLS listing field and metadata associated with the MLS listing information in their native schema to the consolidated data repository having one or more consolidated MLS listing fields of a consolidated data repository schema in accordance with a predetermined set of MLS listing field mapping rules for each and every native MLS listing field to at least one consolidated MLS listing field, wherein the native MLS listing information for each and every native MLS listing field is mapped to a corresponding equivalent field of the consolidated data repository schema including MLS information from different native schemas, wherein the consolidated data repository schema is determined ahead of time by a group of one or more MLSs that form or contribute to the real estate exchange;

transforming, with aid of a controller comprising a processor, both the native MLS listing information for each and every native MLS listing field and the metadata associated with the MLS listing information in their native schema to the one or more consolidated MLS listing fields of the consolidated data repository, wherein the native MLS listing information for each and every native MLS listing field is transformed to the corresponding equivalent field of the consolidated data repository schema including MLS information from different native schemas, and wherein said transformation occurs in accordance with a specific code generated based on at least one of the following: the metadata associated with the native MLS listing information and the consolidated data repository schema; and generating the consolidated data repository having the one or more consolidated MLS listing fields for access by different users of the plurality of MLS databases who would otherwise only have access to their native MLS listing information in their native schema.

7. A computer program product bearing non-transitory machine readable instructions to carry out the method for creating a data repository for a real estate exchange listing information from a plurality of MLS databases according to a common schema, said method comprising:

collecting native MLS listing information from a selected number of databases stored in a memory in their native schema wherein at least two databases have different native schemas, and wherein each of the native MLS listing information includes a corresponding metadata;

mapping both the native MLS listing information for each and every native MLS listing field and metadata associated with the MLS listing information in their native schema to the consolidated data repository having one or more consolidated MLS listing fields of a consolidated data repository schema in accordance with a predetermined set of MLS listing field mapping rules for each and every native MLS listing field to at least one consolidated MLS listing field, wherein the native MLS listing information for each and every native MLS listing field is mapped to a corresponding equivalent field of the consolidated data repository schema including MLS information from different native schemas, wherein the consolidated data repository schema is determined ahead of time by a group of one or more MLSs that form or contribute to the real estate exchange;

transforming, with aid of a controller comprising a processor, both the native MLS listing information for each and every native MLS listing field and the metadata associated with the MLS listing information in their native schema to the one or more consolidated MLS listing fields of the consolidated data repository, wherein the native MLS listing information for each and every native MLS listing field is transformed to the corresponding equivalent field of the consolidated data repository schema including MLS information from different native schemas, and wherein said transformation occurs in accordance with a specific code generated based on at least one of the following: the metadata associated with the native MLS listing information and the consolidated data repository schema; and generating the consolidated data repository having the one or more consolidated MLS listing fields for access by different users of the plurality of MLS databases who would otherwise only have access to their native MLS listing information in their native schema.

8. A computer system having a non-transitory computer readable medium that stores a computer program with machine readable instructions for carrying out the method for creating a data repository for a real estate exchange listing information from a plurality of MLS databases according to a common schema, said method comprising:

collecting native MLS listing information from a selected number of databases stored in a memory in their native schema wherein at least two databases have different native schema, and wherein each of the native MLS listing information includes a corresponding metadata;

mapping both the native MLS listing information for each and every native MLS listing field and metadata associated with the MLS listing information in their native schema to the consolidated data repository having one or more consolidated MLS listing fields of a consolidated data repository schema in accordance with a predetermined set of MLS listing field mapping rules for each and every native MLS listing field to at least one consolidated MLS listing field, wherein the native MLS listing information for each and every native MLS listing field is mapped to a corresponding equivalent field of the consolidated data repository schema including MLS information from different native schemas, wherein the consolidated data repository schema is determined ahead of time by a group of one or more MLSs that form or contribute to the real estate exchange;

transforming, with aid of a controller comprising a processor, both the native MLS listing information for each and every native MLS listing field and the metadata associated with the MLS listing information in their native schema to the one or more consolidated MLS listing fields of the consolidated data repository, wherein the native MLS listing information for each and every native MLS listing field is transformed to the corresponding equivalent field of the consolidated data repository schema including MLS information from different native schemas, and wherein said transformation occurs in accordance with a specific code generated based on at least one of the following: the metadata associated with the native MLS listing information and the consolidated data repository schema; and generating the consolidated data repository having the one or more consolidated MLS listing fields for access by different users of the plurality of MLS databases who would otherwise only have access to their native MLS listing information in their native schema.

9. The method of claim 1 further comprising:
preparing data for the common data repository schema by performing an operational data store staging process that is updated throughout the course of a transaction.

10. The method of claim 9 wherein less information is included in the operational data store staging process than in the consolidated data repository schema.

11. The method of claim 1 wherein the consolidated data repository schema lags behind the operational data store staging process and is partially isolated by the operational data store staging process from changes.

12. The method of claim 1 further comprising access to a data repository having the transformed data in the common data repository schema through a real estate industry standard interface.

13. The method of claim 12 wherein the industry standard interface is Real Estate Transaction Specification (RETS).

14. The method of claim 1 wherein the mapping and transforming need not be a one to one correspondence.

15. The method of claim 14 wherein several source classes from the native MLS listing information are transformed into a single target class for the consolidated data repository schema.

16. The method of claim 14 wherein a single source class from the native MLS listing information are transformed into multiple target classes for the consolidated data repository schema.

17. The method of claim 14 wherein the native MLS listing information includes a multi-valued lookup, which may be transformed onto a different target field in the consolidated data repository schema.

18. The method of claim 1 wherein the specific code is algorithmic code that is automatically generated when a native MLS schema changes, when a combined schema changes, or when the mapping requirements change.

19. The method of claim 1 wherein real-time updates to native MLS listing information are provided to the consolidated data repository having the consolidated data repository schema.

20. The method of claim 19 wherein the native MLS listing information is transformed into the consolidated data repository schema in substantially real-time.

21. The method of claim 1 further comprising generating an operational data store having consolidated MLS listing information of the same format as the consolidated data repository and of lesser quantity than the consolidated data repository.

22. The method of claim 21 wherein the MLS listing information of the operational data store is more quickly accessible than the information of the consolidated data repository.

23. The method of claim 1 further comprising delivering relevant MLS listing information from the consolidated data repository to one or more MLS clients.

24. The method of claim 23 wherein access to the relevant MLS listing information is controlled according to user and access control information.

* * * * *